Figure 1:
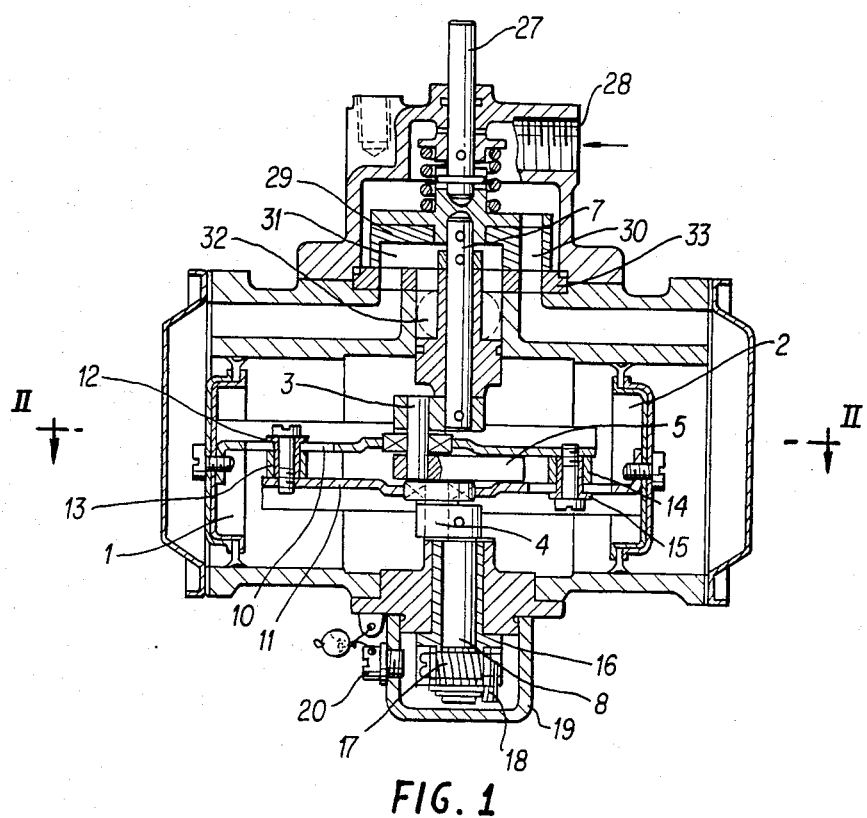

United States Patent [19]

Hüster

[11] Patent Number: 4,526,032
[45] Date of Patent: Jul. 2, 1985

[54] INSTALLATION FOR MEASURING LIQUID QUANTITIES

[75] Inventor: Bernhard Hüster, Borchen, Fed. Rep. of Germany

[73] Assignee: Deutsche Geratebau GmbH, Salzkotten, Fed. Rep. of Germany

[21] Appl. No.: 499,170

[22] PCT Filed: Aug. 5, 1982

[86] PCT No.: PCT/DE82/00161

§ 371 Date: May 12, 1983

§ 102(e) Date: May 12, 1983

[87] PCT Pub. No.: WO83/01108

PCT Pub. Date: Mar. 31, 1983

[30] Foreign Application Priority Data

Sep. 14, 1981 [DE] Fed. Rep. of Germany ....... 3136387

[51] Int. Cl.³ .............................................. G01F 3/18
[52] U.S. Cl. ........................................ 73/245; 92/12.1
[58] Field of Search ........................ 73/246, 244, 247

[56] References Cited

U.S. PATENT DOCUMENTS

| 1,915,663 | 6/1933 | Granberg | 73/246 |
| 1,971,559 | 8/1934 | Granberg | 73/246 |
| 1,986,747 | 1/1935 | Parker | 73/246 |
| 2,337,310 | 12/1943 | Chrisman et al. | 73/246 |
| 2,565,287 | 8/1951 | Willson | 73/244 |
| 2,667,784 | 2/1954 | Batchelder | 73/247 X |
| 2,760,384 | 8/1956 | Chrisman | 73/247 |

FOREIGN PATENT DOCUMENTS

| 0724685 | 7/1984 | Fed. Rep. of Germany | 73/246 |
| 0338029 | 12/1959 | Switzerland | 73/246 |

Primary Examiner—Daniel M. Yasich
Attorney, Agent, or Firm—James E. Nilles

[57] ABSTRACT

There is proposed an installation for measuring quantities of liquid (of the liquid measuring motor type) with two cylinders of which the pistons cooperate by means of cranks. Each piston has a crankpin. To vary the crank radius of a crankpin and thereby vary the stroke of a piston for the fine adjustment of the traversing fluid quantity, the eccentricity of the pin is adjustable with respect to the crankshaft in two parts. To this effect, the pin pivots on a turning portion of an eccentric sleeve, said sleeve being closely connected by a worm screw to the crankshaft. Both pins are arranged on a guiding disc with an angle of 60° with respect to their axes, they are supported by roller bearings and cooperate with the pistons which are connected to two mutually guided parallel cross-slides.

3 Claims, 8 Drawing Figures

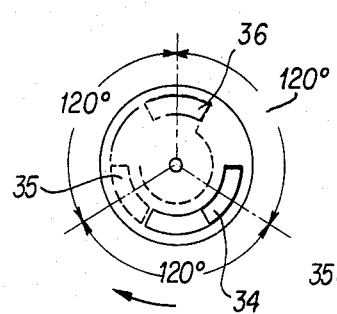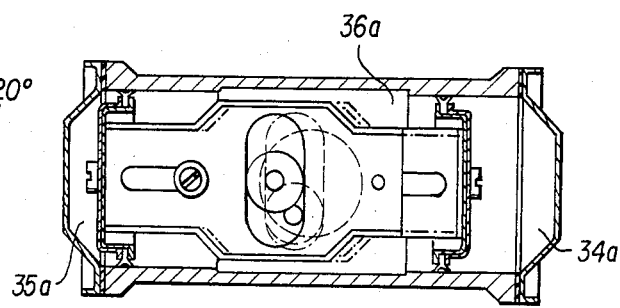
FIG. 3A                FIG. 3B
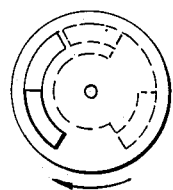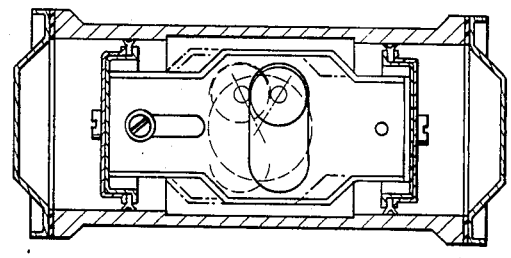
FIG. 4A                FIG. 4B
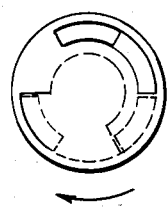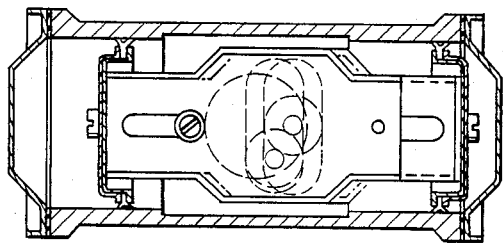
FIG. 5A                FIG. 5B

INSTALLATION FOR MEASURING LIQUID QUANTITIES

This invention relates to apparatus for measuring liquid quantities, having cylinders that are arranged in a housing, a piston reciprocable in each cylinder, and a crankshaft to which the pistons are connected; and the invention is more particularly concerned with a liquid quantity measuring apparatus having two laterally opposite cylinders, the pistons of which form separate working chambers towards the outer dead center points and form a common working chamber between them, wherein the crankshaft is formed in two parts and the pistons are connected by means of a linkage with crankpins on the crankshaft that are located eccentrically to its axis and at such positions around its axis as to define with that axis an angle of 60° to one another, and wherein an upper one of the crankshaft parts is connected above the cylinder housing with a rotary valve which, by way of control passages formed therein, guides the liquid to be measured periodically and sequentially to the separate working chambers and also directs returning liquid to an outlet in the housing.

An apparatus of this general type, which is also called a fluid measuring motor, is known from Swiss Pat. No. 338,029. In this, the cylinders are arranged in a V at an angle of 120° and operate on a common crankpin. For guiding pistons that operate in a staggered arrangement, a substantial construction expense is necessary, and it is also necessary to provide correspondingly expensive equipment for the manufacture of such liquid measuring motors. It happens to be especially disadvantageous that because of the common crankpin, neither of the two pistons can be individually adjusted in its stroke.

The same also applies in principle to a liquid measuring motor of the construction known from West German published patent application No. 22 51 304, which comprises at least two pairs of measuring cylinders in a star-shaped housing, having their pistons connected by means of flexible piston rods with a common crankpin. Piston stroke adjustment by changing the crankpin eccentricity relative to the axis of the crankshaft operates simultaneously upon all of the pistons or piston pairs uniformly.

From West German Pat. No. 713,374 there is known a piston-type liquid measuring device with four crosswise arranged, pairwise opposite cylinders, wherein the pistons of each cylinder pair are connected, by means of a connecting rod for each, with a common crankpin of the crankshaft, which is guided by means of a bearing roller in two slide guides that extend perpendicularly to one another.

With these last mentioned known devices, too, a substantial manufacturing cost is necessary, and there does not exist the possibility of being able to change the stroke of one of the pistons.

Finally, liquid measuring motors with two cylinders are known in which the cylinders are arranged opposite one another relative to the crankshaft axis, wherein the pistons operate on a two-throw crankshaft, for the manufacture of which a correspondingly high construction cost is necessary.

The invention solves the heretofore existing problem in apparatus of the above-described class for measuring liquid of being able to combine the advantage of a two-cylinder liquid measuring motor of simple manufacture with the advantages of a two-part crankshaft, and of providing along with this the possibility of being able to change the piston stroke of one of the two pistons by adjustment of the crank radius, whereby an especially fine adjustment of the throughflow quantity for one cycle is obtained.

This objective is obtained according to the invention in that the linkage that connects the pistons and the crankpins with one another is formed as mutually guiding parallel cross-slides, that the crankpins are carried by a guide disc that is arranged in spaced relationship between the ends of the two parts of the crankshaft, and that on a bottom one of the crankshaft parts there is provided a device for adjusting the stroke of one piston by means of a hollow shaft which is eccentric and rotatable and which surrounds that one crankshaft part.

The arrangement of the pistons opposite one another relative to the crankshaft axis has, in the first place, the substantial advantage that identical cylinder housings can be employed for both pistons. Because the pistons are drivingly connected through their respectively associated cross-slides with two separate crankpins, one crankpin can be arranged to be adjustable as to its crank radius so as to make possible the changing of the stroke of its associated piston. There arises through this a doubling of the degree of fineness of adjustment in comparison to piston stroke adjustments which are divided between the two pistons.

There exists the further advantage that on the basis of the two part construction and the form-connected mutually guided crankshaft, there is made possible the employment of cross-slides that operate as straight thrust cranks, which mutually guide one another by form connection, whereby the manufacture and employment of further guide elements within the cylinder housing is made unnecessary.

For the mutual guidance of the cross-slides, each is fastened at one end to its associated piston and at its opposite end has a slide member that is guided in a longitudinal slot in the neighboring cross-slide and extends across a distance between the cross-slides. Through this mutual guidance of the cross-slides, tilting motions are prevented.

Preferably the crankpins are eccentrically so arranged on the guide disc as to define with its axis an angle of 60° to one another, and they are carried on the guide disc by form connection to it. By guide disc is here to be understood any rotatable element that carries crankpins eccentrically to its axis. The crankpins are coupled with the ends of the shaft parts of the two-part crankshaft by means of cranks. The adjustable shaft part which has on its crank the crankpin that is adjustable as to its eccentricity is carried in an eccentric sleeve and its end portion remote from that crankpin projects out of that sleeve and is formed with teeth that comprise a worm wheel. The eccentric sleeve is rotatable about a fixed axis which coincides with the axis of the other shaft part, and it carries a worm which meshes with said worm wheel and which is adjustingly rotatable about an axis transverse to said fixed axis. Because the worm is carried by the eccentric sleeve, the worm and worm wheel normally constrain the eccentric sleeve to rotate with the adjustable shaft part, and thus to rotate in unison with the nonadjustable shaft part; but adjusting rotation of the worm, to rotate the eccentric sleeve relative to the adjustable shaft part, adjustingly varies the crank radius of the crankpin for the adjustable shaft part and thus varies the stroke of the piston connected with that crankpin. Through this adjusting eccentric displacement of the one shaft part, the guide disc also moves out of its position in which it is normally concentric to the other shaft part, into a very slightly eccentric position, and revolves in this position with the piston action. By adjusting the worm and the eccentric sleeve in one rotational direction, revolution imposes centrifugal force upon the crankpin that is adjustable as to its eccentricity, and adjustment in the opposition direction imposes upon it centripetal force, each of which forces can be utilized for adjusting the stroke of the associated piston for compensation for wear.

The worm that serves for adjustment of the eccentric sleeve on the one crankshaft part is held in its position of rest by means of a spring.

To prevent tampering, the eccentric sleeve and the worm are covered by a liquid-proof screw cap, which can be lead sealed against being screwed off.

Figure 2:
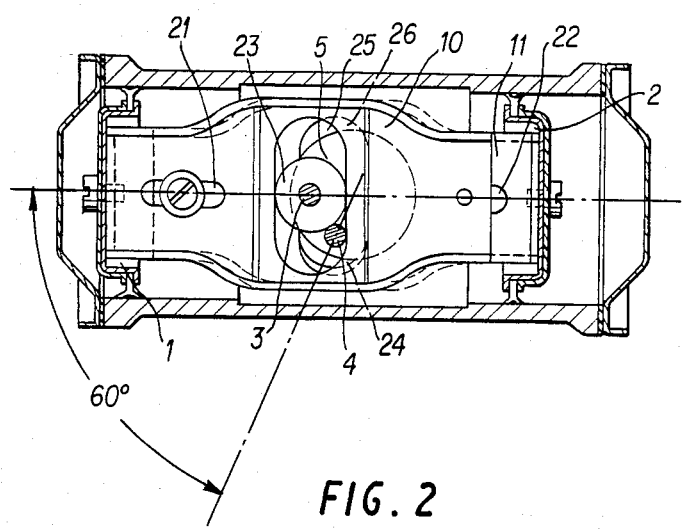

An exemplary embodiment of the apparatus for measuring of liquid quantities according to the invention, more fully explained in the description, is depicted in the drawings wherein:

FIG. 1 is a longitudinal medial section view through the cylinder housing for two pistons which lie opposite one another relative to the crankshaft axis;

FIG. 2 is a cross-section through the cylinder housing on the plane of the line II—II in FIG. 1; and FIGS. 3A through 5B are views generally similar to FIG. 2, showing positions of the pistons and crankshaft at each of three successive instants, taken at crankshaft positions 120° apart, along with the corresponding condition in each case of the rotary valve, shown diagrammatically at the left of the figure.

As FIG. 1 illustrates, the liquid to be measured, coming from a delivery pump (not shown), enters the apparatus at the level of an output shaft 27 by way of an inlet nipple 28 in the cylinder housing and flows to the vicinity of a rotary valve 29, through the control passage 30 of which the liquid is periodically and sequentially conducted to the chambers that are separated from one another by the pistons 1 and 2, as explained in more detail hereinafter. The control of the displaced liquid to the respective piston sides as well as its connection with the output liquid through an outlet nipple 32 that is designated by broken lines in FIG. 1 is accomplished by means of a control plate 33 that cooperates with the rotary valve 29 and is stationarily received in the cylinder housing, through control openings therein provided and through a rotary valve cap 31 that is provided on the back side of the rotary valve 29.

As FIG. 1 furher shows in longitudinal medial section, the two cylinder housing halves for receiving the two pistons 1, 2 that lie opposite one another relative to the crankshaft axis are formed identically and are divided by the shaft parts 7 and 8 of a two part crankshaft. Laterally outwardly the cylinder housing halves are closed by housing covers which bound separated working chambers 34a, 35a (FIG. 3B) for the two pistons 1, 2, which chambers are at the sides of the respective center points pistons that are remote from the crankshaft axis. Between the pistons, they cooperate with one another and the housing to define a common working chamber. The pistons operate together with two separate crankpins 3, 4 in such a manner that one of the two pistons is carrying out a stroke movement just as the other piston is moving through a dead center or point of reversal of its stroke direction.

For this purpose the movement of the pistons relative to one another is transmitted to the two separate crankpins 3, 4 through a cross-slide 10, 11 associated with each piston that functions as a direct thrust crank, one end of which is rigidly connected to the piston. The cross-slides for the two pistons extend parallel to one another, spaced apart, and for straight guidance each is provided, at its end remote from its securement to its piston, with its respective longitudinal slot 21, 22 in which runs a slide member 13, 14 of plastic that is fastened to the neighboring cross-slide by means of a screw 12, 15.

For transmitting force to the crankpins the cross-slides 10, 11 are respectively provided with guide slots 25, 26 which extend transversely to the piston stroke movement and to the axis of the crankpin and receive bearing rollers 23, 24 that surround the crankpins 3, 4.

The cross-slide 10 that is connected with the piston 1 accordingly operates with the crankpin 3, and the cross-slide 11 connected with the piston 2 operates with the crankpin 4.

Both crankpins are arranged on a guide disc 5 that is disposed concentrically to the shaft parts 7, 8 between the cross-slides 10, 11. In relation to the axis of this guide disc 5, both crankpins 3, 4 are eccentric and are fastened to the guide disc at locations displaced from one another by 60° around the crankshaft axis, as FIG. 2 shows. The crankpin 3 is eccentrically connected to the crankshaft part 7 and thus translates the stroke movement of the piston 1 into a rotary motion of the shaft part 7, while the crankpin 4 is eccentrically connected to the crankshaft part 8 and thus transforms the stroke motion of the piston 2 into a rotary motion of the shaft part 8.

For setting and changing the stroke of the piston 2 the crankpin 4 is adjustable as to its eccentricity. To this end, the crankshaft part 8 that carries this crankpin is carried in an eccentric sleeve 16 that is rotatable with the shaft portion 8 and is confined to such rotation in the same direction as that shaft portion by an adjustment worm 17. The worm 17 is restrained against rotation by a spring 18 that frictionally engages it.

The eccentric sleeve 16 and the worm 17 are covered by a liquid-proof sealing screw cap 19. After this screw cap is screwed on, the screw cap can be leaded to the eccentric sleeve and to the positioning flange that receives the cylinder housing halves, in addition to which it is provided with a plug 20 that is normally secured by the lead but which can be removed from access to one end of the worm 17 for rotational adjustment of it.

The manner of operation of the apparatus is such that the liquid to be measured, which flows into the housing through the inlet nipple 28, moves both of the pistons, which in turn set the crankshaft in rotation through the cross-slides 10, 11, the respective crankpins 3, 4, and the crankshaft parts 7, 8 which respectively carry those crankpins. The incoming liquid first comes to the rotary valve 29, which is rotatably driven by the crankshaft and which rotates adjacent to control plate 33 in the housing.

As FIGS. 3A–5B show, the control plate 33 is provided with three control openings 34, 35, 36 that are spaced around it at 120° angles. Two of these control openings, for example the control openings 34 and 35, are connected by way of passages that can be seen in FIG. 1 with the separated working chambers that are designated in FIG. 3B by 34a and 35a. The positions of the pistons, the cross-slides and the crankpins that are shown in FIG. 3B correspond to those of the same members in FIG. 2. As the rotary valve rides across these control openings, the liquid to be measured flows periodically and sequentially to the separated working chambers 34a and 35a. The periodicity arises from the rotational velocity of the rotary valve and the angular spacing of the control openings 34 and 35 that are associated with the respective separated working chambers 34a and 35a.

Through the third control opening 36 that is provided in the control plate the liquid flows into the working chamber 36a that is common to the two pistons when the rotary valve arrives at a corresponding position. In the displacement phase of the pistons relative to the common working chamber 36a, the liquid leaves the cylinder housing through the outlet nipple 32; whereas during the displacement phase of the pistons in the direction towards the separated working chambers 34a, 35a, the liquid flows to the outlet nipple 32 through the rotary valve cap or shell 31 that is provided on the back side of the rotary valve, and thus leaves the housing.

If, now, for example, the control passage 30 in the rotary valve passes over the control opening 34 in the control plate that leads to the working chambers 34a of the piston 2, the liquid is conducted to the back side of the piston 2, to set this piston 2 in motion, and with it its cross-slide 11 and the crankpin 4. Since the crankpins 3 and 4 are connected with one another by means of the guide disc 5, the piston 1 with its cross-slide 10 is at the same time moved through its dead center position. In the subsequent movement, liquid is conducted, through the control opening 35 that is spaced 120° in the rotational direction of the rotary valve, to the working chambers 35a and thus to the back side of the piston 1, which consequently moves the piston 2 through its inner dead center position.

Beginning with the rotary valve and piston position shown in FIG. 4B, liquid is conducted to the common chamber 36a during passage of the control opening 36, while the working chamber 34a is connected by means of the rotary valve cap 31 with the outlet nipple and the liquid in that working chamber 34a is displaced in the direction of the outlet. In the subsequent movement, as shown in FIG. 5, the working chamber 35a is connected with the outlet through the rotary valve cap, and the piston 2 is moved through its outer dead center position.

The stroke of the piston 1 is defined by the eccentricity of the crankpin 3 and remains constant. By changing the eccentricity of the crankpin 4 by means of the adjustable worm 17 on the eccentric sleeve 16, the stroke of the piston 2 can be initially set and subsequently adjusted. The crankshaft thus set into rotation is drivingly connected with an indicating device not shown in the drawings, by reference to which the magnitude of the delivered liquid quantity can be read off.

The apparatus according to the invention can be employed not only for measuring liquid quantities but basically also for measuring of gaseous media.

I claim:

1. Apparatus for measuring quantities of flowing liquid, of the type comprising a housing that defines cylinders, a piston for each said cylinder that is reciprocatingly displaceable in its cylinder by liquid flowing through the housing, and a crankshaft connected with the pistons to be rotated by their displacement so that the number of revolutions made by the crankshaft is dependent upon quantity of liquid flowing through the housing, said apparatus being characterized by:

A. said crankshaft comprising two shaft parts, each having an axis,
   (1) one of which rotates on a fixed axis with which its axis coincides,
   (2) the other of which is axially spaced from said one shaft part, and
   (3) each of which carries on eccentric crankpin, said crankpins being on the adjacent ends of said shaft parts and each crankpin projecting away from the shaft part that carries it;

B. said housing providing a pair of said cylinders which are substantially opposite one another and the pistons of which are at opposite sides of said fixed axis;

C. a pair of elongated parallel cross-slides, one for each piston,
   (1) each connected at one end with its piston for reciprocation with it,
   (2) each having near its other end a connection with the other cross-slide that is lengthwise slideable therealong and whereby the cross-slides are mutually confined to lengthwise reciprocation, and
   (3) each having a transverse slot in which a crankpin is engaged, each crankpin cooperating with one of the cross-slides to translate reciprocation of that cross-slide into rotation of the shaft part which carries that crankpin;

D. a guide disc between the adjacent ends of the shaft parts to which said crankpins are connected at locations thereon that define an acute angle having its apex at said fixed axis and whereby the shaft parts are constrained to rotate in unison; and E. an eccentric sleeve wherein said other shaft part is carried with its axis spaced from and parallel to said fixed axis, said sleeve having an axis which coincides with said fixed axis and being rotatable in the housing about that axis, said sleeve being normally constrained to rotate with said other shaft part but being adjustably rotatable relative to said other shaft part for adjusting the distance between its crankpin and said fixed axis and thereby adjusting the stroke of one of said pistons.

2. The apparatus of claim 1, further characterized by:

F. a worm rotatably mounted on an end portion of said eccentric sleeve with its axis transverse to said fixed axis; and G. said other shaft part having an end portion which meshes with said worm and whereby said worm normally confines the sleeve against rotation relative to said other shaft part but upon being rotated about its axis adjustingly rotates said sleeve relative to said other shaft part.

3. The apparatus of claim 1 wherein said acute angle defined by the locations of the crankpins on said guide disc, in their relation to said fixed axis, is 60°.

* * * * *